United States Patent Office 3,547,621
Patented Dec. 15, 1970

3,547,621
METHOD OF COMBATING WEEDS
Ralph P. Neighbors, Olathe, and Lee V. Phillips, Overland Park, Kans., assignors to Gulf Research & Development Company, Pittsburgh, Pa., a corporation of Delaware
No Drawing. Filed May 29, 1967, Ser. No. 642,174
Int. Cl. A01n 9/20; C07c 131/00
U.S. Cl. 71—121                    19 Claims

ABSTRACT OF THE DISCLOSURE

Weeds in crops such as oats, corn (maize), wheat and grain sorghum are combated by applying to the locus of the weeds effective amounts of certain O-substituted amidoximes, particularly O-2,3,6-trichlorobenzoyl and O-3,6-dichloro-2-methoxy-benzoyl esters of cyclopropanecarboxamidoxime and isobutyramidoxime.

SUMMARY OF INVENTION

In modern methods of grain farming in which harvesting is done with combines, plants are placed so close together that mechanical cultivation is no longer a feasible method of weed control. There is consequently a need for a variety of chemical weed control agents and methods with the proper type of selective action for use in grain crops.

I have discovered that a particular group of compounds can be used to good adavntage in standing crops such as oats, corn, wheat and grain sorghum to obtain both pre-emergent and post-emergent control of a variety of undesirable vegetation, including both broadleaf species and grasses such as crabgrass, brome and millet.

Briefly, my method comprises applying to the locus of the weeds a herbicidally effective amount of an O-substituted carboxamidoxime represented by the structural formula $$X-\underset{NH_2}{C}=N-O-\underset{O}{\overset{\|}{C}}-Y$$

in which X is organic and is selected from the group consisting of methyl, alkyl, cycloalkyl, chloromethyl, chloroalkyl, phenyl, chlorophenyl, chlorophenoxymethyl and methoxyphenyl and Y is chloro-substituted organic, selected from the group consisting of substituted methyl, phenoxymethyl phenyl and phenylmethyl structures which have at least two chloro substituents. Some of the free acids which correspond to the O-acyl substituents in the structural formula also possess phyotoxic properties, but are deficient as to both the high activity and selectivity of the amidoxime esters of the present invention.

DETAILED DESCRIPTION

(A) PREPARATION OF THE WEED CONTROL AGENTS

The amidoximes are conveniently made by reaction of hydroxylamine with a nitrile, according to well known procedures. The amidoxime is then readily acylated by reaction with an acyl halide in the presence of a base. The general method is illustrated in the procedures which follow.

Preparation of isobutyramidoxime
Reaction:

$$(CH_3)_2CHCN + H_2NOH \longrightarrow (CH_3)_2CH\underset{NH_2}{C}=NOH$$

Materials:

125 g. (1.81 moles, isobutyronitrile
136 g. (1.96 mole) hydroxylamine hydrochloride
135.5 g. (0.98 mole) potassium carbonate Procedure:

To a stirred solution of 136 g. (1.96 moles) of hydroxylamine hydrochloride in 250 ml. of water was added slowly a solution of 135.5 g. (0.98 mole) of potassium carbonate in 180 ml. of water. A solution of 125 g. (1.81 moles) of isobutyronitrile in 1 liter of ethanol was added and the mixture was stirred at room temperature for 30 min., then heated at reflux temperature for 4 hrs. The reaction mixture was cooled to room temperature and the solvent was removed under reduced pressure to leave a solid residue. This material was recrystallized from a benzene-hexane solvent mixture to give 87 g. of isobutyramidoxime, M.P. 60–2° C.

This procedure may be employed with only slight modification to make all of the amidoximes, as the necessary nitriles are either available commercially or are easily prepared by known methods. The conversion of amidoximes to esters is illustrated below.

Preparation of O-(2-methoxy-3,6-dichlorobenzoyl)isobutyramidoxime

Reaction:

$$(CH_3)_2CH-\underset{NH_2}{C}=NOH + Cl\overset{O}{\overset{\|}{C}}-\underset{\underset{CH_3}{O}}{\overset{Cl}{\underset{Cl}{\bigcirc}}} \xrightarrow{(C_2H_5)_3N}$$

$$(CH_3)_2CH\underset{NH_2}{C}=NO\overset{O}{\overset{\|}{C}}-\underset{\underset{CH_3}{O}}{\overset{Cl}{\underset{Cl}{\bigcirc}}}$$

Materials:

10.2 g. (0.1 mole) isobutyramidoxime
24.0 g. (0.1 mole) 2-methoxy-3,6-dichlorobenzoyl chloride
10.1 g. (0.1 mole) triethylamine Procedure:

To a stirred solution of 10.2 g. (0.1 mole) of isobutyramidoxime, 10.1 g. (0.1 mole) of triethylamine and 250 ml. of acetone was added dropwise 24.0 g. (0.1 mole) of 2-methoxy-3,6-dichlorobenzoyl chloride while the temperature was kept below 30° C. After addition had been completed, the mixture was stirred at room temperature for 2 hrs., then the acetone was removed under reduced pressure. The residue was dissolved in ethyl acetate, extracted with water, dried over magnesium sulfate and evaporated to dryness under reduced pressure. The residue was recrystallized from benzene-hexane to give 19.3 g. of O-(2-methoxy - 3,6 - dichlorobenzoyl)isobutyramidoxime, M.P. 92–94° C.

*Analysis.*—calc'd for $C_{12}H_{14}Cl_2N_2O_3$ (percent): C, 47.23; H, 4.62; N, 9.18. Found (percent): C, 47.39; H, 4.51; N, 9.15.

(B) USE OF O-SUBSTITUTED AMIDOXIMES AS HERBICIDES

Specific compounds were employed as weed control agents on a variety of representative plant species under carefully controlled conditions so as to evaluate both activity and selectivity of herbicidal action, according to the following procedures:

(1) Post-emergent activity

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots were sprayed with an aqueous dispersion of the active compound prepared as described above, at a rate of 5 lb. of active compound per acre and at a spray volume of 60 gallons per acre. Approximately one week after the spray application the plants were observed and the results rated according to the following schedule:

Type of action:
C=chlorosis (bleaching)
N=Necrosis
G=Growth inhibition
F=Formative effect
  (abnormal form of growth)
K=Nonemergence Degree:
0=no effect
1=slight effect
2=moderate effect
3=severe effect
4=maximum effect
  (all plants died)

The same rating schedule was employed to judge pre-emergent results obtained according to the procedure below.

(2) Pre-emergent activity

A solution of each active compound was prepared by dissolving 290 mg. of the compound to be tested in 200 ml. of acetone. Disposable paper half-flats were prepared and seeded with a variety of species of plant seeds, then sprayed with the acetone solution at the rate of 10 lb. of active chemical per acre of sprayed area. One flat, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the flats were examined and plant emergence and effects on growth were rated according to the above schedule.

Both post-emergent and pre-emergent results are set forth in the following table.

RESULTS OF HERBICIDE TESTS

| Compound | Type of activity | Crab-grass | Cox-comb | Brome | Millet | Soy-bean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|
| O-(2,4-dichlorophenoxyacetyl)-acetamidoxime, M.P. 110–111° C. | Post | | | | N4 | N4 | | N4 | G1 | G1 | N4 | N4 | N4 | G2 | | N4 |
| | Pre | K4 | K4 | K4 | K4 | K4 | K4 | K4 | G2 | 0 | K4 | K4 | K4 | G2 | | N4 |
| O-(2,4-dichlorophenoxyacetyl)-chloroacetamidoxime, M.P. 119–121° C. | Post | | | | | | | | G2 | G2, N | | | | | | |
| | Pre | K4 | K4 | K4 | K4 | K4 | K4 | K4 | G2 | G2 | K4 | K4 | K4 | N1 | | N4 |
| O-(dichloroacetyl)-2,4-dichlorophenoxyacetamidoxime, M.P. 100–102° C. | Post | | | | | | K4 | | | G1, F | | | | G1 | | N4 |
| | Pre | K4 | K4 | K3, G | K4 | K4 | K4 | K4 | N1 | N1 | K4 | K4 | K4 | | | |
| O-(2,4-dichlorophenylacetyl)-2,4-dichlorophenoxyacetamidoxime, M.P. 113.5–114° C. | Post | | | | | | | | G2 | G3, F | | | | G1 | | N4 |
| | Pre | K4 | K4 | K4 | K4 | K4 | K4 | K4 | G2 | F1 | K4 | K4 | G3, N | G2 | 0 | G3, F |
| O-(2,3,6-trichlorobenzoyl)-cyclopropanecarboxamidoxime, M.P. 118.5–120.5° C. | Post | | | | G3, N | G3, N | G3, F | N, G3, F | N4 | N4 | G2, F | K4 | K4 | 0 | 0 | F, G3 |
| | Pre | N4 | K4 | K4 | N4 | N4 | G3, N | K4 | G, F1 | 0 | F2 | F2 | F3 | | | |
| O-(2,3,6-trichlorobenzoyl)-4-methoxybenzamidoxime, M.P. 144–146° C. | Post | F1 | G1 | F2 | G2 | G3 | F3 | F3 | N, G2 | N, G2 | F2 | F3 | F3 | N, G1 | 0 | N4 |
| | Pre | | | | | N, G1, F | | | | | | | | | | |
| O-(2,3,6-trichlorobenzoyl)-isobutyramidoxime, M.P. 131–133° C. | Post | K4 | K4 | K4 | N, F1 | F3, G | N4 | K4 | N, F1 | N3, G | N, G3 | F, G3 | N4 | N, G1 | 0 | N3 |
| | Pre | G1 | G1 | 0 | F1 | | F3 | F3 | F1 | 0 | F3, G | F1 | F3 | F1 | G1 | F, G3 |
| O-(2,3,6-trichlorobenzamidoxime, M.P. 129–131° C. | Post | | | | | | | | | | | | | | | |
| | Pre | K4 | K4 | K3, G | K4 | K4 | F3 | N, F3 | F2 | F, G1 | N, G3 | F, G3 | F, G3 | F1 | G1 | F, G3 |
| O-(2,3,6-trichlorophenylacetyl)-cyclopropanecarboxamidoxime, M.P. 148–140° C. | Post | K4 | K4 | K4 | K4 | K4 | N4 | K4 | F2 | F1 | K3, G | N4 | K4 | F, G1 | G2 | N4 |
| | Pre | K4 | K4 | K4 | K4 | K4 | F3 | N4 | F3 | F3, G | K4, G | F4 | K4 | 0 | 0 | N4 |
| O-(3,6-dichloro-2-methoxybenzoyl)-cyclopropanecarboxamidoxime, M.P. 134–136° C. | Post | | | | | | | | | | | | | | | |
| | Pre | G2, F | K2, G | G1 | 0 | G1 | G1 | N, G3 | 0 | 0 | N, G3 | F1 | K3, G | F1 | 0 | N4 |
| O-(2,3,6-trichlorobenzoyl)-benzamidoxime, M.P. 100–161° C. | Post | F2, G | K4 | 0 | F2, G | N, F3 | F3 | N, F3 | P2 | P2 | G2, F2 | G1, F1 | G1, F1 | F1 | 0 | N4 |
| | Pre | | | | | | | | | | | | | | | |
| O-(2,3,6-trichlorobenzoyl)-acetamidoxime, M.P. 149–150° C. | Post | K4 | K4 | K4 | N, G3 | K4 | N4 | K4 | N3 | N, G3 | N4 | N, G2 | G1, F1 | N1 | N1 | N4 |
| | Pre | F2, G | G1 | G3, F | F, N3, G | F3, G | F3 | K4 | N3, G | N3, G | N4 | F, N1, G | N4 | F, G3 | N1 | N4 |
| O-(2,3,6-trichlorobenzoyl)-butyramidoxime, M.P. 133.5–135° C. | Post | K4 | K4 | K4 | K4 | K4 | N4 | N4 | K4 | F2 | K3, G | N4 | K4 | F, G2 | N, G2 | N4 |
| | Pre | K4 | K4 | K4 | K4 | K4 | F3 | F3 | N3, G | K3, G | K3, G | F3 | K4 | F2 | G1 | N4 |
| O-(3,6-dichloro-2-methoxy-benzoyl)-isobutyramidoxime, M.P. 92–94° C. | Post | | | | | | | | | | | | | | | |
| | Pre | K4 | K4 | K4 | N, G1 | G1 | F3 | F3 | F1 | F1, G | F, G3 | F3 | N4 | F2 | G1 | N4 |
| O-(2,3,6-trichlorophenyl-acetyl)-isobutyramidoxime, M.P. 145–147° C. | Post | | | | | | | | | | | | | | | |
| | Pre | K4 | K4 | G3 | G3 | K4 | F3 | K4 | F2 | F2, G | N, G2 | F3 | F4 | F2 | G1 | N4 |
| O-(2,3,6-trichlorobenzoyl)-isovaleramidoxime, np20 1.5473. | Post | | | | | | | | | | | | | | | |
| | Pre | K4 | K4 | K3, G | N, G3 | N4 | N4 | K4 | F2, G | F2, G | N, G2 | K4 | N4 | F2 | G1 | N4 |
| O-(3,6-dichloro-2-methoxy-benzoyl)-isovaleramidoxime, M.P. 113.5–115.5° C. | Post | | | | | | | | | | | | | | | |
| | Pre | K4 | K4 | K4 | K4 | K4 | F4 | K4 | F3, G | F3, G | K4 | K4 | K4 | F2 | G1 | N4 |

What is claimed is:

1. The method of combating weeds which comprises applying to the locus of the weeds a herbicidially effective amount of an O-substituted carboxamidoxime represented by the structural formula

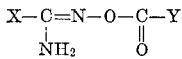

in which X is organic and is selected from the group consisting of, alkyl and chloro-substituted alkyl substituents having from 1 to 5 carbon atoms, cyclopropyl, phenyl, chlorophenyl, chlorophenoxymethyl and methoxyphenyl and Y is chloro-substituted organic, selected from the group consisting of substituted methyl, phenoxymethyl, phenyl and phenylmethyl structures which have at least two chloro substituents attached thereto.

2. The method of combating weeds which comprises applying to the locus of the weeds a herbicidally effective amount of O-(2,4-dichlorophenoxyacetyl)-acetamidoxime.

3. The method of combating weeds which comprises applying to the locus of the weeds a herbicidally effective amount of O-(2,4-dichlorophenoxyacetyl)-chloroacetamidoxime.

4. The method of combating weeds which comprises applying to the locus of the weeds a herbicidally effective amount of O-(dichloroacetyl)-2,4-dichlorophenoxyacetamidoxime.

5. The method of combating weeds which comprises applying to the locus of the weeds a herbicidally effective amount of O-(2,4-dichlorophenylacetyl)-2,4-dichlorophenoxyacetamidoxime.

6. The method of combating weeds which comprises applying to the locus of the weeds a herbicidally effective amount of O-(2,3,6-trichlorobenzoyl)-cyclopropanecarboxamidoxime.

7. The method of combating weeds which comprises applying to the locus of the weeds a herbicidally effective amount of O-(2,3,6-trichlorobenzoyl)-4-methoxybenzamidoxime.

8. The method of combating weeds which comprises applying to the locus of the weeds a herbicidally effective amount of O-(2,3,6-trichlorobenzoyl)-isobutyramidoxime.

9. The method of combating weeds which comprises applying to the locus of the weeds a herbicidally effective amount of O-(2,3,6-trichlorobenzoyl)-4-chlorobenzamidoxime.

10. The method of combating weeds which comprises applying to the locus of the weeds a herbicidally effective amount of O-(2,3,6-trichlorophenylacetyl)-cyclopropanecarboxamidoxime.

11. The method of combating weeds which comprises applying to the locus of the weeds a herbicidally effective amount of O-(2,5-dichloro-6-methoxybenzoyl)-cyclopropanecarboxamidoxime.

12. The method of combating weeds which comprises applying to the locus of the weeds a herbicidally effective amount of O-(2,3,6-trichlorophenylacetyl)-benzamidoxime.

13. The method of combating weeds which comprises applying to the locus of the weeds a herbicidally effective amount of O-(2,3,6-trichlorobenzoyl)-benzamidoxime.

14. The method of combating weeds which comprises applying to the locus of the weeds a herbicidally effective amount of O-(2,3,6-trichlorobenzoyl)-acetamidoxime.

15. The method of combating weeds which comprises applying to the locus of the weeds a herbicidally effective amount of O-(2,3,6-trichlorobenzoyl)-butyramidoxime.

16. The method of combating weeds which comprises applying to the locus of the weeds a herbicidally effective amount of O-(2,5-dichloro-6-methoxybenzoyl)-isobutyramidoxime.

17. The method of combating weeds which comprises applying to the locus of the weeds a herbicidally effective amount of O-(2,3,6-trichlorophenylacetyl)-isobutyramidoxime.

18. The method of combating weeds which comprises applying to the locus of the weeds a herbicidally effective amount of O-(2,3,6-trichlorobenzoyl)-isovaleramidoxime.

19. The method of combating weeds which comprises applying to the locus of the weeds a herbicidally effective amount of O-(2,5-dichloro-6-methoxybenzoyl)-isovaleramidoxime.

References Cited
UNITED STATES PATENTS

| 3,483,231 | 12/1969 | Marcus et al. | 71—121X |
| 3,492,333 | 1/1970 | Dickore et al. | 71—121X |

FOREIGN PATENTS

| 824,534 | 12/1959 | Great Britain | 71—121 |

JAMES O. THOMAS, JR., Primary Examiner

U.S. Cl. X.R.

260—566